United States Patent [19]
Javkin et al.

[11] Patent Number: 5,340,316
[45] Date of Patent: Aug. 23, 1994

[54] SYNTHESIS-BASED SPEECH TRAINING SYSTEM

[75] Inventors: Hector R. Javkin; Elizabeth G. Keate, both of Goleta; Norma Antonanzas-Barroso, Los Angeles; Brian A. Hanson, Goleta, all of Calif.

[73] Assignee: Panasonic Technologies, Inc., Secaucus, N.J.

[21] Appl. No.: 68,390

[22] Filed: May 28, 1993

[51] Int. Cl.$^5$ .................. G09B 9/00; G09B 23/00; G09B 25/00; G06K 9/00
[52] U.S. Cl. ................... 434/185; 434/112; 434/116
[58] Field of Search ............. 434/185, 157, 112, 116, 434/169

[56] References Cited

U.S. PATENT DOCUMENTS

| | | | |
|---|---|---|---|
| 4,641,343 | 2/1987 | Holland et al. | 381/48 |
| 5,015,179 | 5/1991 | Resnick | 434/185 |
| 5,061,186 | 10/1991 | Jost et al. | 434/185 |

FOREIGN PATENT DOCUMENTS 9100582  1/1991  World Int. Prop. O. .......... 434/185

OTHER PUBLICATIONS

Video Voice Speech Training System.
"A Superior Choice Has Arrived . . . ", The new stroboscopy system from Kay Electronics.
IBM SpeechViewer II, An Enhanced Professional tool for speech therapy and speech modification.
Communicative Disorders Related to Cleft Lip and Palate, 3rd Ed., Edited by Kenneth R. Bzoch, Ph.D.
"Make Faster Progress in Articulation Therapy" (Palatometer Model 6300).
"Is Nasality the Problem? Consider the Nasometer".
"VISI-Pitch 6095/6097!".
The Volta Review, vol. 89, No. 3, Apr. 1987, SSN 0042-8639.
"What's New From Kay", New Products-Product Improvements/Software Update-Application Support.
The Second Joint Meeting of ASA and ASJ, Nov. 1988.

A Speech Training System for Profoundly Deaf Children, Yoshinori Yamada, Norio Murata.
Computer-Aided Speech Training for the Deaf, R. S. Nickerson, D. N. Kalikow, and K. N. Stevens.
IBM Personal System/2 SpeechViewer, Four Case Studies.
IBM Personal System/2 SpeechViewer, A Guide to Clinical and Educational Applications.
Speech Training Programs ("Vocalization" System), Feb. 5, 1986, M. El Beze, H. Crepy, F. Destombes, G. Rouquie.
IBM Independence Series . . . , Solutions for people with Disabilities.
Speechviewer, IBM Personal System/2.

(List continued on next page.)

Primary Examiner—Gene Mancene
Assistant Examiner—Cindy A. Cherichetti
Attorney, Agent, or Firm—Price, Gess & Ubell

[57] ABSTRACT

This invention includes a speech training system that allows a student to enter any utterance to be learned and have the articulatory model movements required to produce the utterance displayed on a CRT screen. The system accepts a typed utterance, breaking it down into a set of phonemes. The set of phonemes is sent to a synthesizer, which produces a set of parameters indicating the acoustic characteristics of the utterance. The acoustic parameters are converted into articulatory parameters emphasizing the frequency, nasality, and tongue-palate contact required to produce the typed utterance. The articulatory parameters are displayed on the CRT screen. The acoustic parameters are also sent to a formant synthesizer which converts the parameters into speech output. The system measures a student's production and then evaluates the student's production against the parameters of the typed utterance for its similarity. Feedback on the similarity is displayed on the CRT screen.

17 Claims, 5 Drawing Sheets

OTHER PUBLICATIONS

Use of Nasometry as a Diagnostic Tool for Identifying Patients with Velopharyngeal Impairment.
ISTRA, The Indian Speech Training Aid.
"Computational Processing of Palatographic Patterns", O. Fujimura, I. Fujii, R. Kagaya, Japan.
Speech Training of Deaf Students Using a Palatographic Display, Karen Youdelman and Harry Levitt.
"Review of Text-to-Speech Conversation for English", Dennish H. Klatt, Massachusetts Institute of Technology.
"Speech Articulation, and Perception", V. A. Kozhevnikova, et al., Washington D.C.
"CISTA" (Computer Integrated Speech Training Aid), Yoshinori Yamada and Norio Murata, Japan.

SYNTHESIS-BASED SPEECH TRAINING SYSTEM

BACKGROUND OF THE INVENTION

1. Field of the Invention

This invention relates to a speech training system which permits a speech-impaired student to type in any word or sentence he or she wants to learn and observe, on a CRT display, the articulatory model movements required to produce that word or sentence. The system is particularly suited to deaf children, who do not receive auditory information and who tend to learn to type at an early age. The invention can also be used to help normal-hearing students learn how to speak foreign languages.

2. Description of Related Art

The most fundamental method for teaching deaf children to speak consists of teachers using their own vocal apparatus for showing the correct vocal gestures. Children can observe the external appearance of the lips, jaw and, to a limited extent, the tongue, as speech is produced by a teacher. Children are sometimes instructed to use tactile feedback from the teacher's vocal organs for comparison to their own. This method has obvious limitations in that many of the articulatory gestures in speech are not observable externally.

In recent years, it has been possible for teachers to demonstrate how speech is produced with the aid of instruments and of computer programs which analyze speech. These instruments and programs permit the observation of many characteristics of speech, including its acoustic manifestation, as the speech is being produced. This system is best demonstrated in the Computer Integrated Speech Training Aid (CISTA) developed by Matsushita. The CISTA provides multiple-channel data gathered by several transducers.

1. The dynamic palatograph. This instrument, whose use was first reported by 1962 by a Soviet researcher, Y. Kuzmin, indicates contact between the tongue and palate by means of a number of electrodes on an artificial palate that is worn in the mouth. When the tongue touches one of the electrodes, a low-voltage circuit is completed which is registered by instruments outside the mouth. The indication as to the presence or absence of contact is provided on a CRT display.

2. Nasal sensor. An electret microphone held to the side of one nostril by headgear or temporarily attached with adhesive tape provides an indication of nasal vibration.

3. Throat sensor. An electret microphone, held at the larynx by means of a flexible collar, provides an indication of glottal vibration.

4. Airflow sensor. Several methods have been used for sensing airflow, using a device held by the child in front of the mouth.

5. A standard microphone provides input for acoustic analysis.

The teaching of speech to the deaf is made difficult by the limited time the children have with speech teachers. While a hearing child receives speech input and acoustic feedback as to his own production for many hours a day, a deaf child typically only receives such feedback during training sessions which may be as infrequent as one session a week.

Combining such speech training devices as the instruments of the CISTA with computers allows children to receive part of their training without a teacher's intervention, greatly expanding the time that training is available. However, speech training devices such as CISTA which provide feedback directly to children are limited to teaching individual sounds or a limited set of preprogrammed utterances. The purpose of the present invention is to permit a child to receive information as to the production of any utterance without the assistance of a teacher.

In addition, other prior art includes text-to-speech systems which permit any utterance which is typed to be automatically synthesized. A device called "DEC-Talk," produced by Digital Equipment Corporation, is currently the best-known example of text-to-speech for English. The text-to-speech system is limited to producing audible sounds only.

OBJECTS AND SUMMARY OF THE INVENTION

An object of the present invention is to provide a speech training system that permits a student to type into a computer any utterance desired to be learned and have the articulatory model movements displayed on a CRT screen.

Another object of this invention is to permit a student to attempt to speak the typed utterance and receive feedback, on the CRT screen, on the similarity of his or her efforts to the model production displayed.

This is accomplished by the system first editing the typed utterance and sending it to the synthesis unit. The synthesis unit parses the utterance, analyzes it into a phonemic string, and creates a set of parameters that specify the acoustic characteristics of the utterance for every 10 ms. The parameters are sent back to the apparatus and are converted to a set of parameters that indicate the articulatory model movements required to produce the typed utterance. The articulatory model movements are then displayed on a CRT screen.

By using a set of transducers to measure the student's nasal vibration, glottal vibration, expiratory airflow, tongue contact, and audible sound, the speech training system evaluates the student's enunciation for its similarity to the model. The evaluation is then displayed on a CRT screen.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a synthesis-based speech training system constructed in accordance with the teachings of the invention shown in FIGS. 1-5 of the drawings, in a manner to be described in greater detail below.

Figure 2:
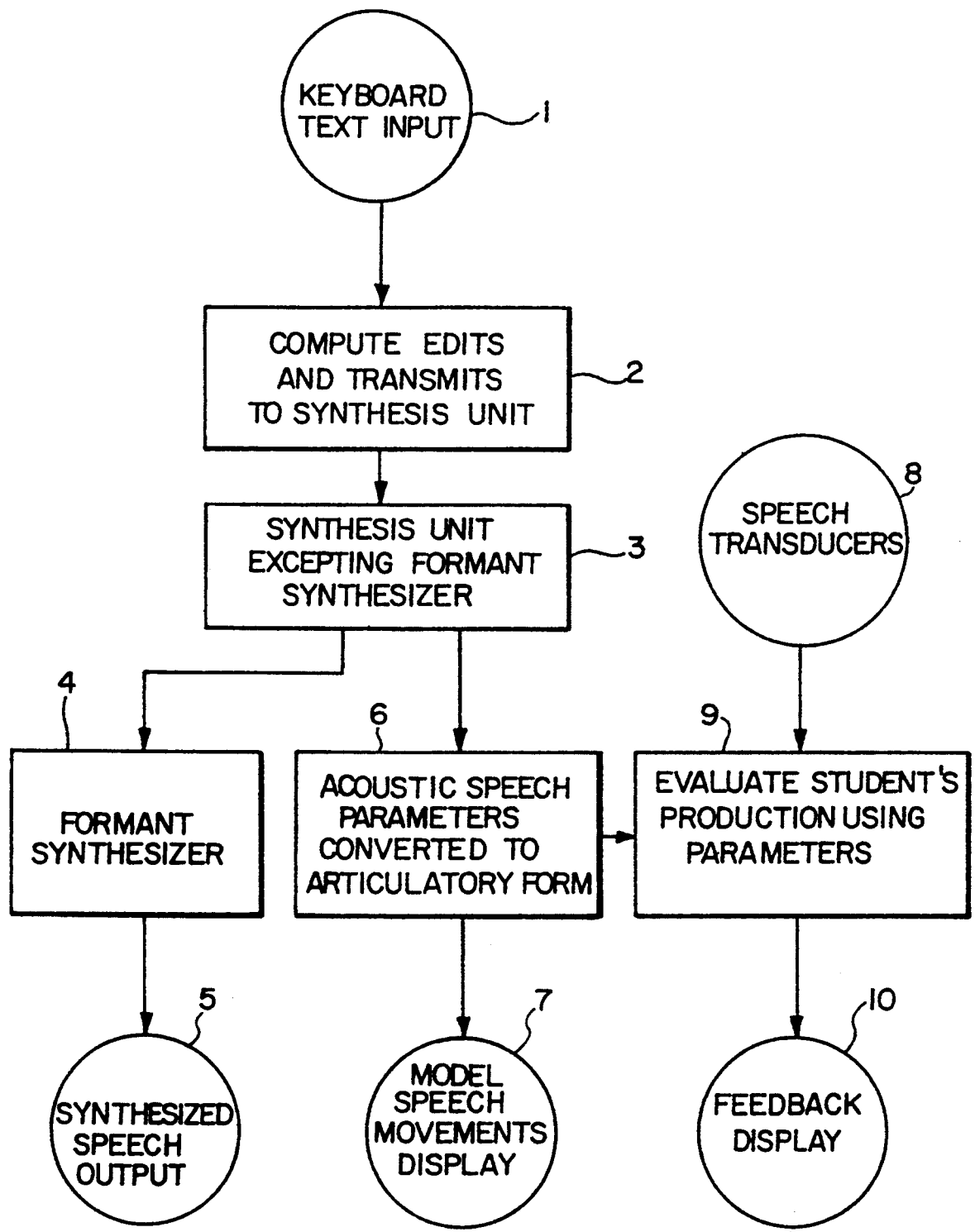
FIG. 2 is a block diagram showing the speech training system.

The synthesis-based speech training system can be implemented on a laboratory digital computer. The system consists of a means for entering an utterance to be learned, which is preferably a keyboard, connected to the speech training system (FIG. 2). The entered utterance is transferred to the speech training system in ASCII representation. The system then uses a text-to-speech system to automatically synthesize the typed utterance. A device called "DECTalk," produced by Digital Equipment Corporation, is currently the best-known example of text-to-speech for English. A newer text-to-speech system, STLtalk, is being developed at Speech Technology Laboratory, division of Panasonic Technologies, Inc., and is actually being implemented in the invention.

Communication between the synthesis unit 3 and the speech training system is done via an RS-232 port. The RS-232 configuration is set for XON/XOFF protocol and the transfer settings are 9600 baud, 8 data bits; 1 stop bit, and none for parity. The synthesis unit 3 receives the input text string of phonemes and places it in an input buffer.

The text-to-speech system parses the entered utterance in stage 2. The system performs a syntactic analysis of the utterance based on locations of any orthographic commas, as well as the syntactic role of function words and verbs that are detected during the dictionary matching process.

Figure 1:
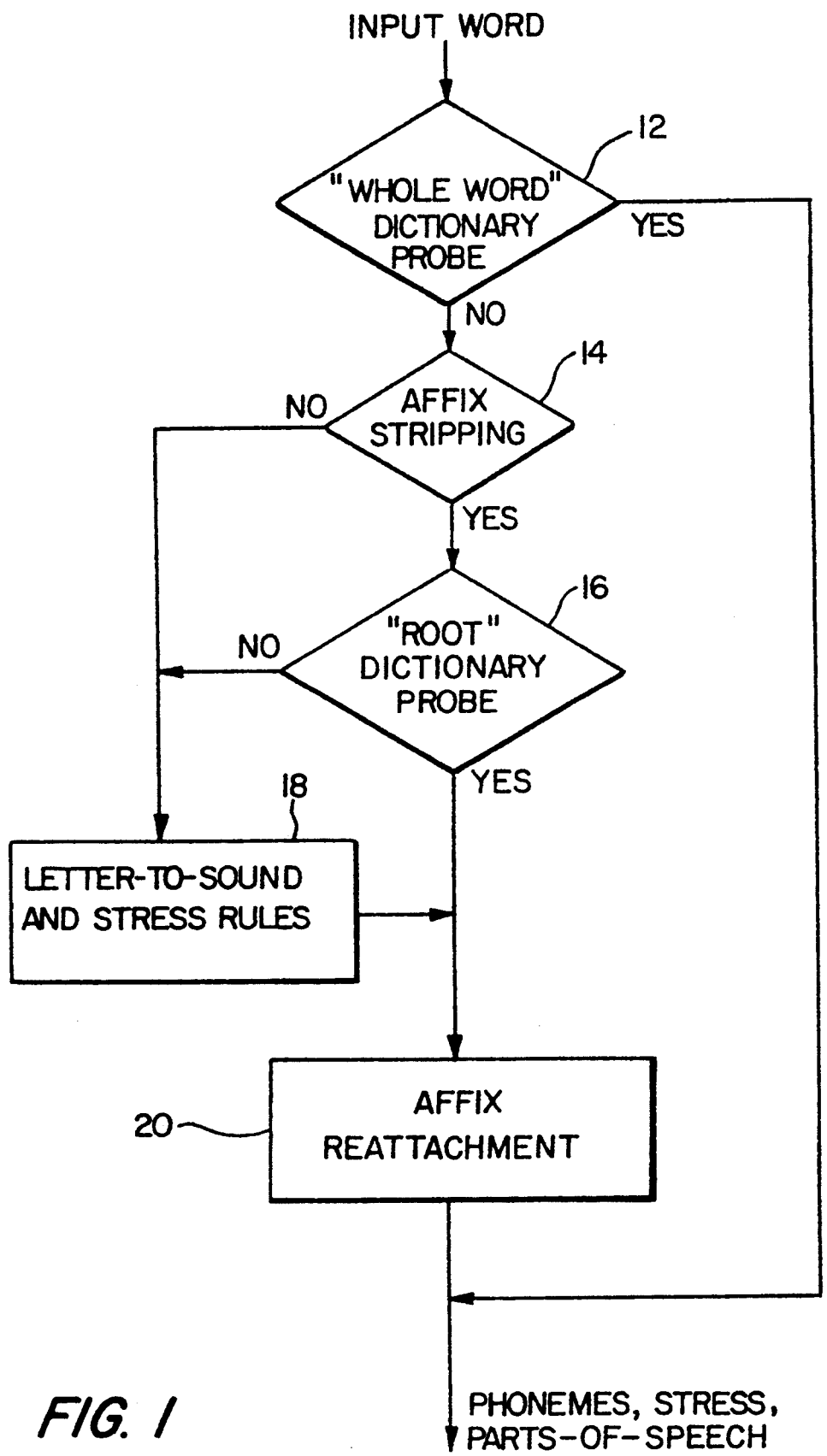
FIG. 1 is a block diagram showing the steps involved in converting an ASCII orthographic representation for a word into phonemes, stress, and parts-of-speech information.

Next, a phonemic representation is obtained as shown in FIG. 1. Each word is compared with entries in a small pronunciation dictionary 12. If no match is found, the word is broken into small pieces (morphemes) by attempting to remove common suffixes such as "ed" and "ing," etc. at 14. Then the remaining root is again compared with entries in a phonemic dictionary 16. If there is still no match, a set of letter-to-phoneme rules is invoked to predict the pronunciation on stage 18. In addition, a part of the phonemic conversion process concerns the derivation of a stress pattern for the syllables of a word. Stress must be predicted if the word is not in the system vocabulary, or if the orthographic word is broken down into root plus affixes and an affix changes the stress pattern given for the root. The stress level of the syllable will be indicated by inserting a stress symbol just prior to the vowel in the phonemic representation. Absence of a stress symbol means that the symbol is unstressed.

The synthesis unit 3 processes this buffer and produces a set of 20 acoustic parameters for every 10 ms of the string of phonemes. The acoustic parameters specify the acoustic characters of the utterance to be demonstrated. The parameters are created by matching the transferred information with predetermined measurements in values based upon the fundamental frequencies and amplitudes, the formant frequencies and bandwidths, and the noise source for speech production of the utterance to be demonstrated. A sample of the acoustic parameters is set forth below.

| N  | Symbol | Name |
|----|--------|------|
| 1  | AV     | amplitude of voicing in dB |
| 2  | AF     | amplitude of frication in dB |
| 3  | AH     | amplitude of aspiration in dB |
| 4  | AVS    | amplitude of sinusoidal voicing in dB |
| 5  | F0     | voicing fundamental frequency in Hz |
| 6  | F1     | first formant frequency in Hz |
| 7  | F2     | second formant frequency in Hz |
| 8  | F3     | third formant frequency in Hz |
| 9  | F4     | fourth formant frequency in Hz |
| 10 | FNZ    | nasal zero frequency in Hz |
| 11 | B1     | first formant bandwidth in Hz |
| 12 | B2     | second formant bandwidth in Hz |
| 13 | B3     | third formant bandwidth in Hz |
| 14 | A2     | second parallel formant amplitude in dB |
| 15 | A3     | third parallel formant amplitude in dB |
| 16 | A4     | fourth parallel formant amplitude in dB |
| 17 | A5     | fifth parallel formant amplitude in dB |
| 18 | A6     | sixth parallel formant amplitude in dB |
| 19 | AB     | bypass path amplitude in dB |
| 20 | OQ     | open quotient |

Two identical sets of the acoustic parameters are created. Following the reception of the utterance termination character, a period, the first set is stored in an array.

The second set of acoustic parameters is then sent on to a formant synthesizer 4 (FIG. 1) which converts the acoustic parameters into an output signal in the form of an analog speech signal 4. The formant synthesizer 4 is then played over a loud speaker 5 for those students who have some residual hearing.

The first set of acoustic parameters which were arrayed in the synthesis unit 3 are then sent back to the speech training system through the RS-232 port. The speech training system reads in these values and stores them into another array. The speech training system then converts the acoustic parameters into articulatory parameters 6. The articulatory parameters show three forms of the typed utterance.

The speech training system converts one group of the acoustic parameters to articulatory parameters showing various attributes of the typed utterance. The group of acoustic parameters used includes the fundamental frequency, the amplitude of the utterance, the presence or absence of voicing, and the frequency of formants 1, 2, and 3. The text-to-speech system supplies the group of acoustic parameters to the speech training system in Hertz multiplied by 10. The speech training system, which uses Hertz, then divides the parameters by 10 before displaying them on the CRT screen.

The speech training system also produces articulatory parameters showing the nasality of the typed utterance. Nasalization in speech is appropriate for sounds such as /m/, /n/, and others, and is frequently present in the speech of deaf speakers for sounds where it is inappropriate and impairs communication. Nasalization is characterized acoustically in the frequency domain by the presence of both nasal poles and nasal zeros. Typically only one nasal pole and one nasal zero is acoustically significant. These only appear when the velum, the valve between the nose and the mouth, is in its lowered, open position. It disappears when the velum is closed.

Figure 3:
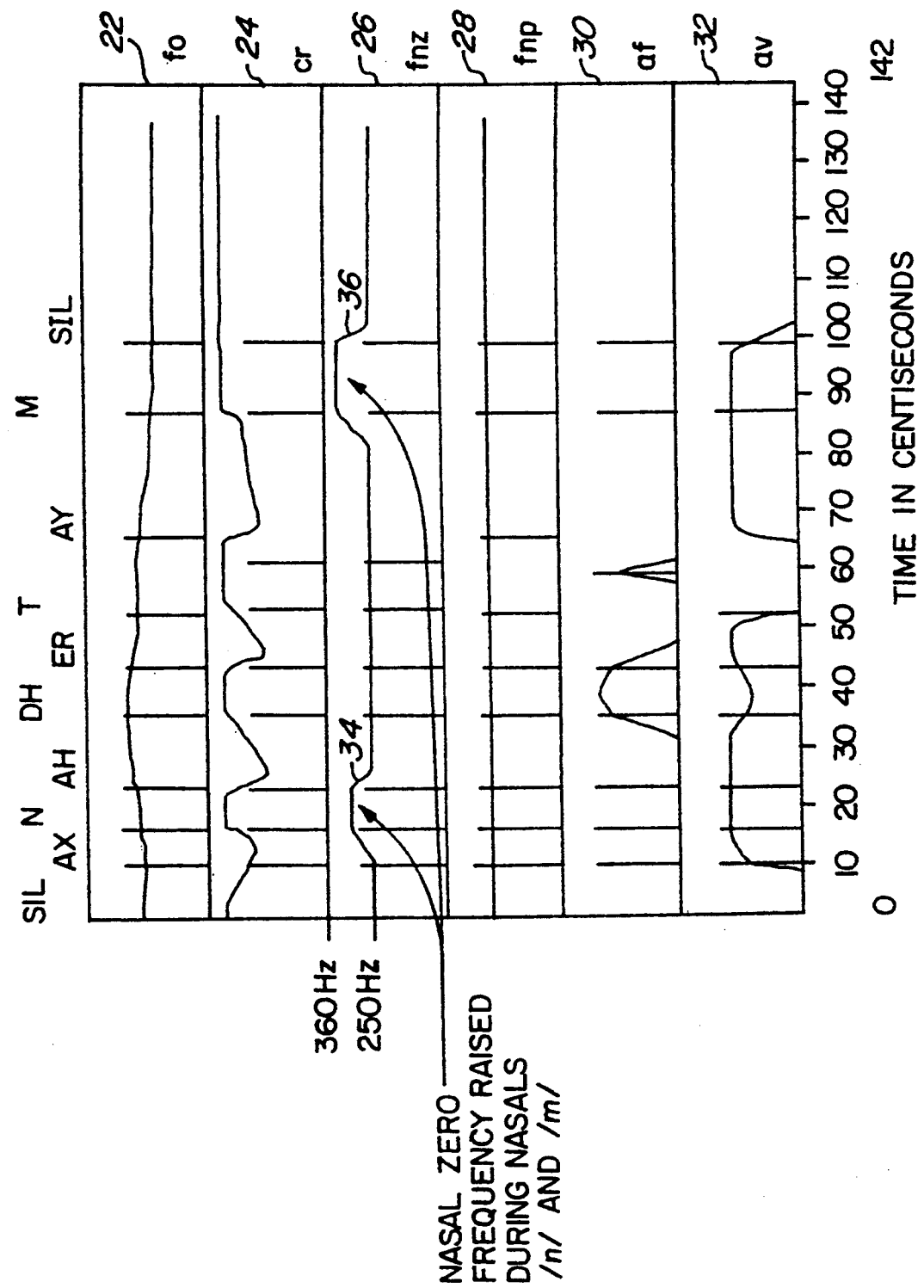
FIG. 3 is a sound spectrum showing the acoustic parameters of the nasal zero and nasal pole produced during an utterance.

The text-to-speech system supplies a variable of acoustic parameters measuring the nasality of the typed utterance. The speech training system uses the acoustic parameters to create a nasalization index. The text-to-speech system produces acoustic parameters for non-nasal sounds by setting the nasal pole and nasal zero at the same frequency and bandwidth, so that they cancel each other out. The text-to-speech system used in the present invention sets both the nasal pole and nasal zero at 250 Hz for non-nasal sounds. For producing nasal sounds, the frequencies of the nasal pole and nasal zero are moved to different values so that they each have an effect in different parts of the sound spectrum. The frequency of the nasal zeros is temporarily increased to 330 or 360 Hz, depending upon whether the sound is /n/or/m/ 34, 36. This is shown in FIG. 3. The text-to-speech system also provides the amplitude of the nasal formant 30, 32. Typically, values of the amplitude of the nasal formant range between 30 and 60, but if it is equal to zero, there is no nasalization 30, 32. Using the acoustic parameters supplied by the text-to-speech system, the speech training system uses an equation to create a nasalization index indicating to the student the amount of nasality required to produce the typed utterance. One form of the equation is:

$$NI = ((|F_{nf} - F_{nz}|)/(|F_{nf} - F_{nz}|)_{max})* \left( \frac{(AN-1) - |(AN-1)|}{2} + 1 \right)$$

where:
NI = nasalization index
$F_{nf}$ = frequency of the nasal formant
$F_{nz}$ = frequency of the nasal zero
AN = amplitude of the nasal formant
All the input variables are integers The second part of the right side of the equation is included to multiply the value by zero if the amplitude of the nasalization is zero, and to multiply the value by one if it is not.

Figure 4:
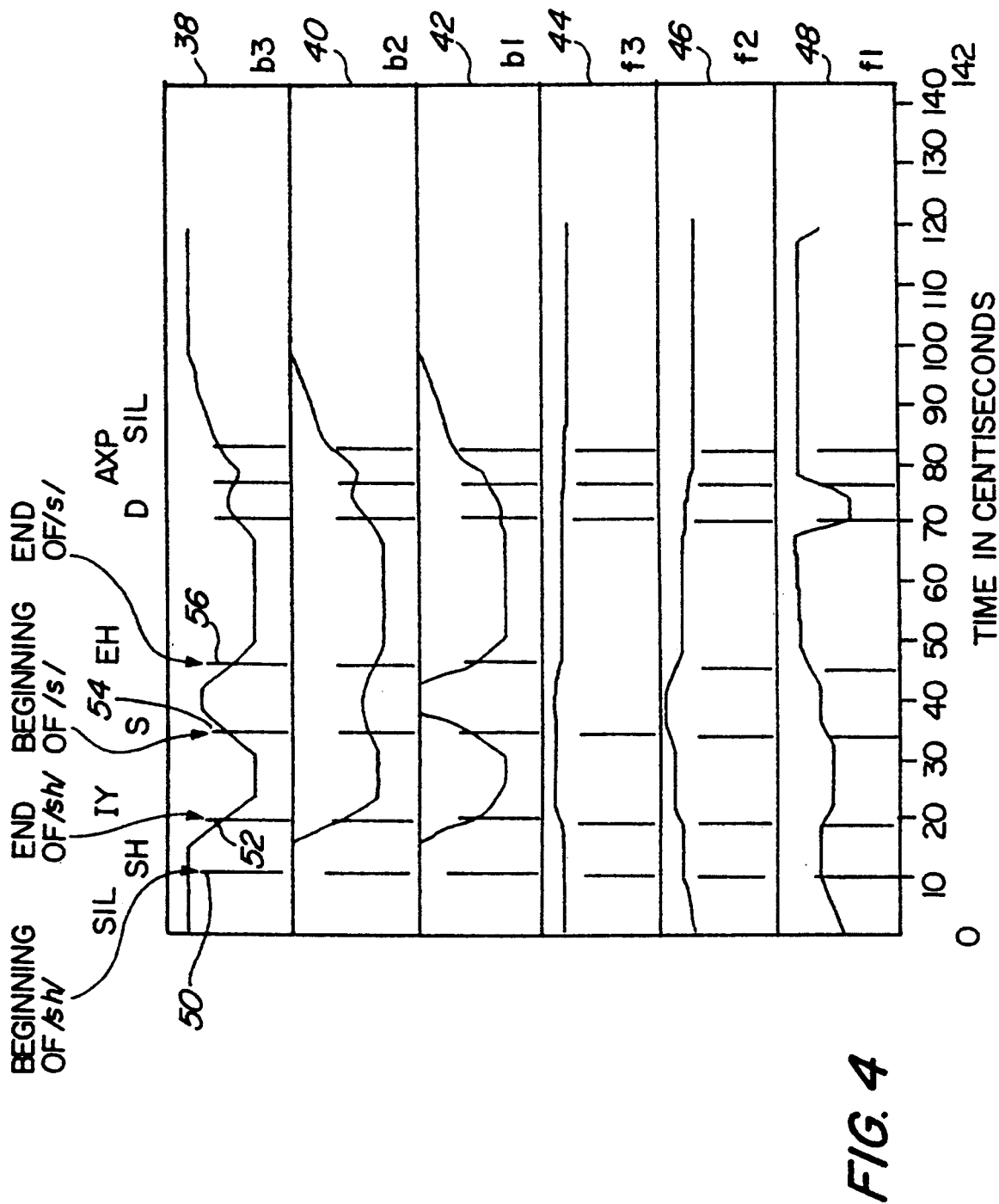
FIG. 4 is a sound spectrum showing the parameters of tongue contact pattern against the palate during an utterance.
Figure 5:
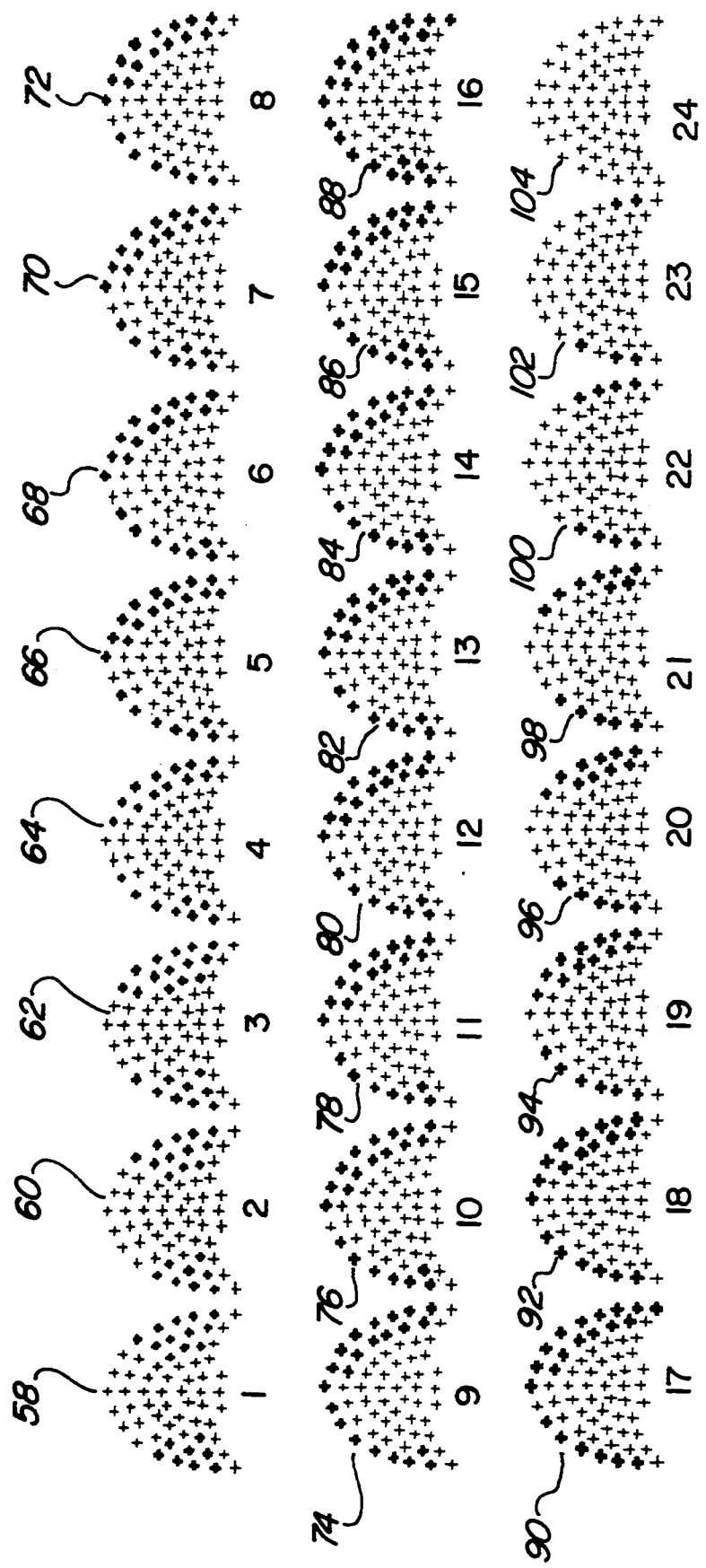
FIG. 5 is a display of the actual tongue contact pattern created during an utterance.

The speech training system also creates articulatory parameters showing the tongue-palatal contact required to produce the typed utterance. The text-to-speech system provides acoustic parameters and information indicating the onset and offset of consonants with tongue-palate contact. Such information include the formant bandwidths in Hertz 38, 40, 42 and the formant frequencies in Hertz 44, 46, 48. For example, as shown in FIG. 4, in the utterance "She said," the text-to-speech system provides along with synthesis parameters the beginning and end of the sound /SH/ and the beginning and end of the sound /s/. The tongue-palate contact pattern is shown to the student on the CRT screen, as displayed in FIG. 5, which shows a series of 10-millisecond frames representing the contact between the palate and the tongue. The darker dots in the frame represent contact and the lighter dots represent no contact. In FIG. 5, frames 1–7 show the contact for the consonants in "she" going into the following /s/. The full /s/ begins at frame 8 and starts to release at frame 17. By frame 24, there is a complete release of contact, required for the consonants in "said."

The actual tongue-contact pattern as displayed on the CRT screen in the speech training system come from three sources. There is a set of prestored tongue contact patterns for the consonants /t/, /d/, /s/, /z/, /sh/, /zh/, /l/, /n/, and /r/. At present, the contact for /k/ and /g/ spoken immediately before or after front high vowels are not included, but the principle is the same.

In addition, a teacher can put a tongue-contact pattern into the system for any sound in any environment. Furthermore, a teacher can select a tongue-contact pattern from a production that the student has said well once but needs practice in repeating. This is frequently the most useful sort of pattern, because each person's optimal tongue-palate contact depends strongly on his or her particular palate shape.

The teacher sets which of these sources will be used for each consonant. The prestored tongue-contact pattern is used as the default. For all sources, the system contains the contact pattern sequence beginning before the onset and following the release of the consonant.

After viewing the articulatory model movements required to produce the typed utterance, the student may then attempt to produce the typed utterance by attempting to speak the utterance. The speech training system uses the instrument of the Computer Integrated Speech Training Aid (CISTA) described above. The instruments of the CISTA use several transducers to measure the student's production. The student's tongue-palate contact, nasal vibration, glottal vibration, expiratory airflow, and acoustic production are entered into the speech training system in the form of measurement by speech transducers 8.

The speech training system then evaluates the measurements of the student's production against the acoustic parameters for the typed utterance for similarity at stage 9. The speech training system then provides the student with feedback on the difference between his or her produced model movements and those model movements required to produce the typed utterance by feedback display 10.

The speech training system implements various original video games to display the articulatory model movements required to produce the typed utterance and feedback on the student's success in attempting to produce the required model movements. The use of video games helps to maintain the child's attention and teach the child to produce the utterance.

A second embodiment of the invention includes a synthesis-based speech training system to help students with normal hearing to learn to speak foreign languages. The second embodiment uses the same text-to-speech training system as the first embodiment, notwithstanding the following differences.

The student enters text of the target language into the speech training system by keyboard 1. The text-to-speech system edits the entered text 2. The edited text at stage is sent to a synthesis unit 3. The synthesis unit 3 processes the text and produces a set of 20 acoustic parameters. The acoustic parameters specify the acoustic characters of the text in a predetermined foreign language.

Two identical sets of the acoustic parameters are created. The second set is sent on to a formant synthesizer 21 which converts the acoustic parameters into an output signal in the form of an analog speech signal. The formant synthesizer output is then played over a loud speaker 5 in the form of the predetermined foreign language.

The first set of acoustic parameters is then sent to the speech training system. The speech training system then converts the acoustic parameters into articulatory parameters at stage the articulatory model movements required to produced the entered text in a predetermined foreign language. The articulatory parameters are then displayed on a CRT screen 7 or similar display.

After viewing the articulatory model movements required to produce the entered text in the foreign language, the student may attempt to produce the text in the foreign language by speaking the entered text in the foreign language. The speech training system measures the student's speech by transducers 8. The speech training system then evaluates the measurements of the student's production against the acoustic parameters for the entered text in the foreign language at stage 9. The speech training system then provides the student with feedback on the difference between his or her produced model movements and those model movements required to produce the entered text in the foreign language on a feedback 10.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A synthesis-based speech training apparatus, which comprises:
    input means for entering an utterance to be demonstrated;
    editing means for converting said utterance to be demonstrated into a set of phonemes;
    synthesizer means for converting the set of phonemes into a set of acoustic parameters which specify the acoustic characteristics of the utterance to be demonstrated;
    means for converting the set of acoustic parameters into a set of articulatory parameters;
    means for displaying the set of articulatory parameters;
    means for converting the set of acoustic parameters into a synthesized speech output;
    means for producing the synthesized speech output in an audible sound;
    means for measuring a tongue contact pattern produced by the operator;
    means for measuring an acoustic sound produced by the operator;
    means for measuring an expiratory airflow produced by the operator;
    means for measuring a nasal vibration produced by the operator;
    means for measuring a neck vibration produced by the operator;
    means for evaluating the similarity of the measurements produced by the operator to the set of acoustic parameters of the utterance to be demonstrated; and
    display means for displaying the similarity between the set of acoustic parameters of the utterance to be demonstrated and the measurements produced by the operator.

2. A synthesis-based speech training apparatus, which comprises:
    input means for entering an utterance to be demonstrated;
    editing means for converting the utterance to be demonstrated into a set of phonemes;
    synthesizer means for converting the set of phonemes into a set of acoustic parameters which specify the acoustic characteristics of the utterance to be demonstrated;
    means for converting the set of acoustic parameters into a set of articulatory parameters; and
    means for displaying the set of articulatory parameters.

3. The synthesizer-based speech training apparatus of claim 2, further comprising formant synthesizer means for converting the set of acoustic parameters into a synthesized speech output.

4. The synthesizer-based speech training apparatus of claim 2, further comprising means for producing the synthesized speech output in an audible sound.

5. The synthesizer-based speech training apparatus of claim 2, further comprising means for measuring a spoken utterance.

6. The synthesizer-based speech training apparatus of claim 5, wherein said means for measuring a spoken utterance includes a means for measuring a tongue contact pattern.

7. The synthesizer-based speech training apparatus of claim 5, wherein said means for measuring a spoken utterance includes means for measuring an acoustic sound.

8. The synthesizer-based speech training apparatus of claim 5, wherein said means for measuring a spoken utterance includes means for measuring an expiratory airflow.

9. The synthesizer-based speech training apparatus of claim 5, wherein said means for measuring a spoken utterance includes means for measuring a nasal vibration.

10. The synthesizer-based speech training apparatus of claim 5, wherein said means for measuring a spoken utterance includes means for measuring a neck vibration.

11. The synthesizer-based speech training apparatus of claim 5, further comprising means for evaluating the similarity between the set of acoustic parameters of the utterance to be demonstrated and the measurements of the spoken utterance.

12. The synthesizer-based speech training apparatus of claim 11, further comprising display means for displaying the similarities between the set of acoustic parameters of the utterance to be demonstrated and the measurements of the spoken utterance.

13. A synthesizer-based speech training method, which comprises:
    entering an utterance to be demonstrated;
    converting the utterance to be demonstrated into a set of phonemes;
    converting the set of phonemes into a set of acoustic parameters which specify the acoustic characteristics of the utterance to be demonstrated;
    converting the set of acoustic parameters into synthesized speech output;
    producing the synthesized speech output in an audible sound;
    converting the acoustic parameters into a set of articulatory parameters;
    displaying the set of articulatory parameters;
    measuring a tongue contact pattern;
    measuring an acoustic sound;
    measuring an expiratory airflow;
    measuring a nasal vibration;
    measuring a neck vibration;

evaluating the similarity between the set of acoustic parameters of the utterance to be demonstrated and the measurements produced by the operator; and displaying the evaluation of the similarity between the set of acoustic parameters of the utterance to be demonstrated and the measurements produced by the operator.

14. A synthesizer-based speech training method, which comprises:

entering an utterance to be demonstrated;

converting the utterance to be demonstrated into a set of phonemes;

converting the set of phonemes into a set of acoustic parameters which specify the acoustic characteristics of the utterance to be demonstrated;

converting the acoustic parameters into a set of articulatory parameters; and displaying the set of articulatory parameters.

15. The synthesizer-based speech training method of claim 14, further comprising:

converting the set of acoustic parameters into synthesized speech output;

producing the synthesized speech output in an audible sound;

measuring a spoken utterance, which includes measuring a tongue contact pattern, an acoustic sound, an expiratory airflow, a nasal vibration, and a neck vibration;

evaluating the similarity between the set of acoustic parameters of the utterance to be demonstrated and the measurements of the spoken utterance; and displaying the similarity between the set of acoustic parameters of the utterance to be demonstrated and the measurements of the spoken utterance.

16. A synthesizer-based speech training method, which comprises:

entering text of the language to be learned;

converting the entered text into a set of phonemes;

converting the set of phonemes into a set of acoustic parameters which specify the acoustic characteristics of the entered text in a preset foreign language;

converting the acoustic parameters into a set of articulatory parameters which specify the articulatory model movements required to produce the entered text in the foreign language; and displaying the set of articulatory parameters.

17. The synthesizer-based speech training method of claim 16, further comprising:

converting the set of acoustic parameters into synthesized speech output;

producing the synthesized speech output in the foreign language in an audible sound;

measuring a spoken utterance, which includes measuring a tongue contact pattern, an acoustic sound, an expiratory airflow, a nasal vibration, and a neck vibration;

evaluating the similarity between the set of acoustic parameters of the entered text in the foreign language and the measurements of the spoken utterance; and displaying the similarity between the set of acoustic parameters of the entered text in the foreign language and the measurements of the spoken utterance.

* * * * *